United States Patent [19] [11] 4,089,557
Leiter [45] May 16, 1978

[54] UPWARDLY PIVOTABLE VENT OR SLIDING ROOF PANEL FOR AUTOMOBILES

[75] Inventor: Robert Leiter, Krailling, Germany
[73] Assignee: Webasto-Werk W. Baier KG, Germany
[21] Appl. No.: 665,286
[22] Filed: Mar. 9, 1976

Related U.S. Application Data

[63] Continuation of Ser. No. 460,110, Apr. 11, 1974, abandoned.

[30] Foreign Application Priority Data

Apr. 14, 1973 Germany .............................. 2319063

[51] Int. Cl.² .................................................. B60J 7/04
[52] U.S. Cl. .................................. 296/137 F; 49/71; 98/2.14
[58] Field of Search ........... 296/137 R, 137 F, 137 B, 296/137 E, 137 J; 98/2.14, 2.15; 49/60, 71, 325; 160/93, 94

[56] References Cited

U.S. PATENT DOCUMENTS

| 1,603,182 | 10/1926 | Aborn | 296/137 R |
|---|---|---|---|
| 2,124,240 | 7/1938 | Thorp | 49/71 X |
| 2,311,413 | 2/1943 | Persson | 160/94 X |
| 2,398,894 | 4/1946 | Schofield | 98/2.15 |
| 2,925,769 | 2/1960 | Kubatzky | 49/71 X |
| 3,572,822 | 3/1971 | Schmid | 296/137 F |

FOREIGN PATENT DOCUMENTS

| 578,247 | 11/1931 | Germany | 49/71 |
|---|---|---|---|
| 382,781 | 11/1932 | United Kingdom | 296/137 B |

Primary Examiner—Evon C. Blunk
Assistant Examiner—Michael J. Forman
Attorney, Agent, or Firm—Craig & Antonelli

[57] ABSTRACT

An openable vehicle roof structure to serve as a retractable sliding roof or an air vent has a roof opening in the horizontal portion; a downwardly recessed frame surrounding the opening on at least its front and side edges, as an integral part of the roof structure; a rigid panel matching the opening and serving as a closure member for it when aligned with the edges thereof; a pivot connection between the panel and the roof frame which permits the panel to be pivoted about a horizontal axis located near its front edge, the rear edge of the panel being thereby movable upwardly out of the roof opening; two rigid, generally flat shutter members arranged adjacent to the lateral edges of the panel to extend along at least a major portion of the panel length; a connecting mechanism for movably connecting the shutter members to the panel so that, when the rigid panel is in its open, upwardly pivoted position, they extend downwardly from its lateral edges, thereby substantially covering the gap between the panel and the lateral edges of the opening.

The connecting mechanism include a pivot connection between each shutter member and the rigid panel, the pivot connection defining a horizontal pivotal axis located near the forward extremity of the shutter members, the latter being thereby pivotable vertically relatively to the panel, and means for spring-biasing the pivotable shutter members toward a downwardly extended position.

10 Claims, 6 Drawing Figures

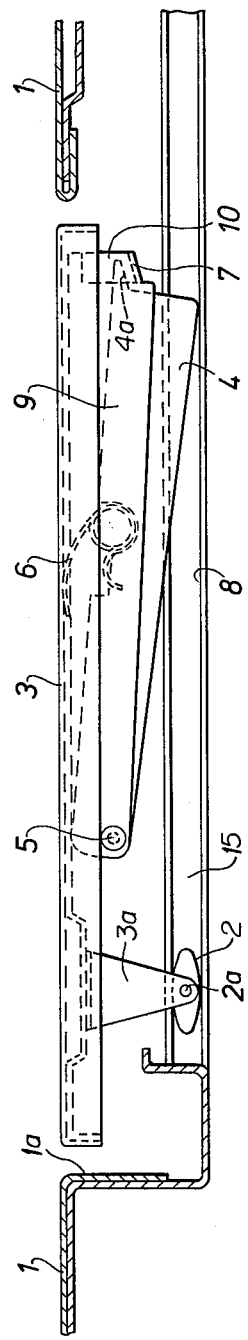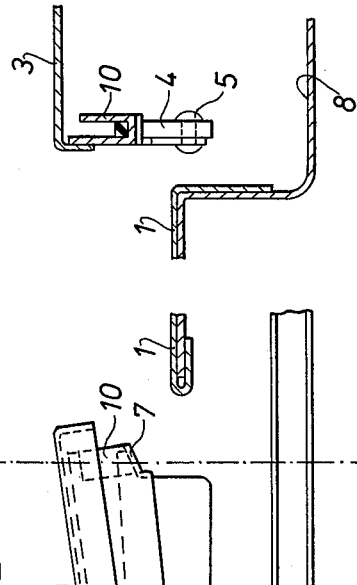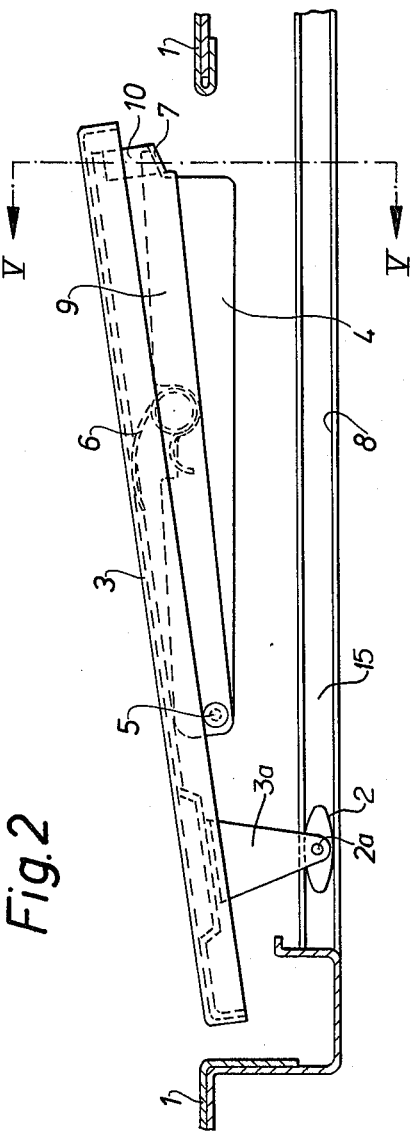

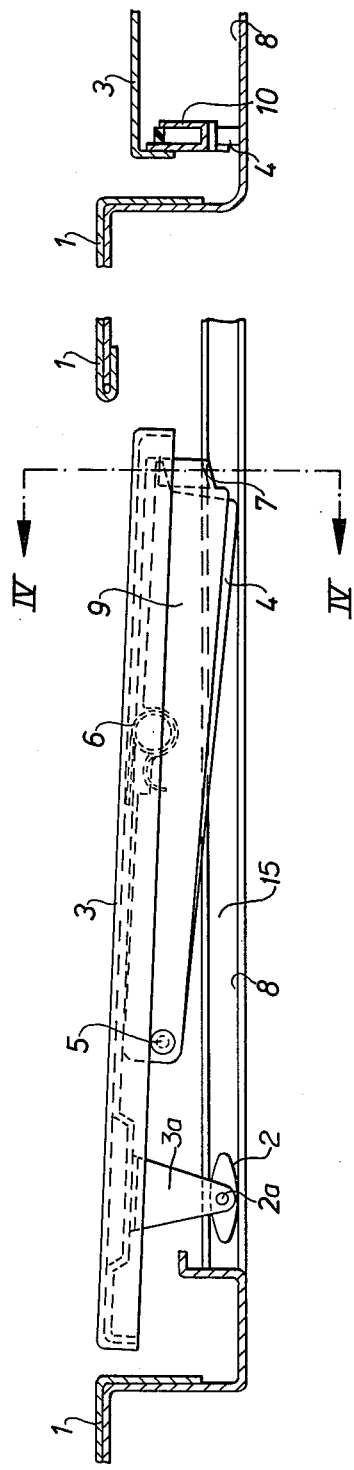

UPWARDLY PIVOTABLE VENT OR SLIDING ROOF PANEL FOR AUTOMOBILES

CROSS-REFERENCE TO RELATED APPLICATIONS

This application is a continuation application of co-pending U.S. patent application Ser. No. 460,110 filed on Apr. 11, 1974, now abandoned, and the filing date thereof and the priority under convention of the corresponding German application No P 23 19 063.8 filed Apr. 14, 1973 are claimed.

BACKGROUND OF THE INVENTION

1. Field of the Invention

The present invention relates to automobile roof vents and sliding roof structures, and in particular to vents or sliding roof panel structures in which the rear edge of the vent panel or sliding roof panel is pivotable upwardly out of the roof opening.

2. Description of the Prior Art

Vent panels and sliding roof panels which are openable by pivoting their rear edges upwardly out of the roof opening are known from various prior art teachings. Also known are sliding roof structures in which the sliding roof panel is openable in two modes, either by pivoting the rear edge of the panel upwardly or by pivoting it downwardly and retracting the panel under the stationary roof portion to create an opening at the front edge of the panel.

In connection with upwardly pivoting panels, especially in cases in which a large pivoting angle is possible, it was found to be necessary to reduce the pivoting angle, whenever the vehicle travelled at higher speeds, because wind and/or water spray would enter through the lateral gap under the raised side portions of the roof panel. This necessity of lowering the roof panel to a very small pivoting angle represents a disadvantage of presently known vents and sliding roof structures.

SUMMARY OF THE INVENTION

It is the purpose of the present invention to eliminate the aforementioned disadvantage by suggesting a simple, improved structure for vent panels and sliding roof panels in which the lateral entry of an air stream or of water spray is prevented, without the need for unnecessarily reducing the opening angle of the roof panel.

In order to meet this objective, the invention suggests an upwardly pivotable roof panel, usable as a vent panel or as a retracting sliding roof panel, which comprises a vertically arranged shutter member on each side of the panel which, when the latter is opened, at least partially covers the triangular lateral gap between the panel and the edge of the roof opening.

A preferred embodiment of the invention features lateral shutters which are pivotably attached to the roof panel and which can be retracted in relation to the latter, when it is desired to inwardly open the sliding roof panel, for example.

An additional advantageous feature of the invention relates to a lateral shutter arrangement in which the shutters are spring-biased downwardly into their extended position, which latter is determined by an abutment. In the case of a retractable sliding roof, when the rear edge of the sliding roof panel is to be lowered for inward opening, the spring-biased shutter members are automatically retracted, as the sliding roof panel is lowered. The lowered panel can then be retracted under the stationary roof portion in the usual manner.

BRIEF DESCRIPTION OF THE DRAWINGS

Further special features and advantages of the invention will become apparent from the description following below, when taken together with the accompanying drawings which illustrate, by way of example, an embodiment of the invention, represented in the various figures as follows:

FIG. 1 shows, within a longitudinal cross section through a roof structure, an elevational end view of a closed roof panel structure embodying the invention;

FIG. 2 shows the structure of FIG. 1 in its upwardly pivoted open position;

FIG. 3 shows the roof structure of FIG. 1 in its downwardly pivoted position prior to retraction;

FIG. 4 is a partial transverse cross section through the structure of FIG. 3 along line IV—IV thereof; and FIG. 5 is a similar partial transverse cross section through the structure of FIG. 2 along line V—V thereof.

DESCRIPTION OF THE PREFERRED EMBODIMENT

Figure 6:
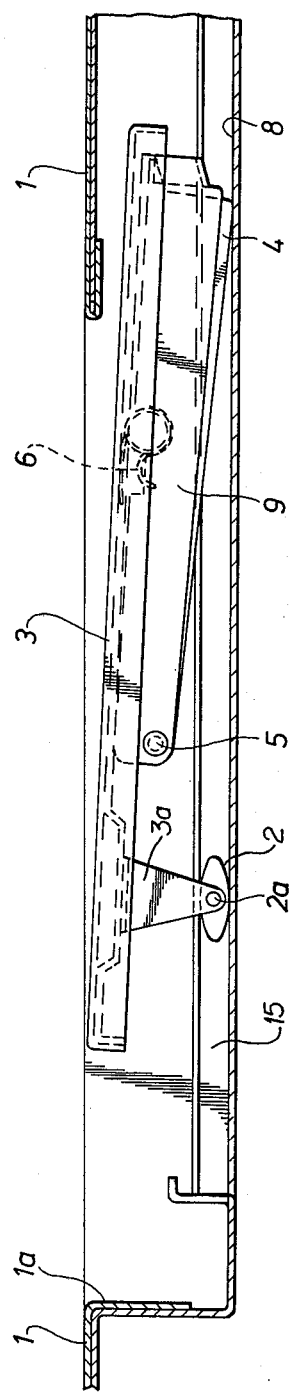
FIG. 6 shows a section corresponding to FIG. 3, with the slide cover partly slid backward and underneath the stationary top element.

As shown on FIGS. 1 to 6 the rigid cover 3 is provided near its front edge on each side with a slide flange 2, pivotable about a horizontal shaft 2a that extends transversely to the longitudinal direction of the vehicle. The slide flange 2 is mounted on the lower end of a vertical arm 3a which is fastened to the cover 3. Slide flange 2 rests, longitudinally displaceable, in a guide rail 15. At each lateral edge of the cover 3 is provided a downward extending fixed blind or capping 9. On the inside of each fixed capping 9 is pivotally mounted a movable shutter or capping 4. The movable cappings 4 are pivotable in vertical planes and relative to the fixed cappings 9, about pivot pins 5 at the front ends of the fixed cappings 9.

The natural tendency of each pivotable capping 4 to pivot downward under its own weight is augmented by a spiral spring 6. Spring 6 presses, in the open position, shown in FIG. 2, of cover 3, the rear end 4a of capping 4 against a stop 7 at the rear end of each fixed capping. A closed or lowered cover 3 according to FIGS. 1, 4 and 6, spring 6 presses movable capping 4 against the bottom of a rain gutter 8. In both cases, a rattling of the pivotable capping 4 is prevented by the effect of spring 6.

In the open position of cover 3 as shown on FIG. 2, the fixed capping 9, jointly with the downward protruding area of pivotable capping 4 closes approximately the lateral rectangular gap produced between the upward pivoted cover 3 and the edge of the top opening 1a, whereby rain- or spray-water is prevented from entering laterally through the top opening 1a to the inside of the car. As shown on FIGS. 5 and 4, the rear end of each fixed capping 9 is U-shape bent so as to form, on one side stop 7 and, on the other side a guide for the rear end 4a of the pivotable capping 4, between capping 9 and the inner side 10.

When the cover 3 is closed the pivotable capping 4 abuts against the wall of the rain gutter 8. This is naturally the case even when cover 3 is lowered (FIG. 3) or is entirely or partly slid underneath the fixed top element 1 (FIG. 6). In each case the spring 6 acts so as to press the pivotable capping 4 against the wall of the rain gutter 8, whereby rattling noises are avoided.

The pivoting of cover 3 upward and downward, and the retracting thereof underneath the fixed top element 1 can be carried out by known means in a manner as is evident from an examination of FIGS. 1, 2, and 3 of the drawings.

It should be understood, of course, that the foregoing disclosure describes only a preferred embodiment of the invention and that is it intended to cover all changes and modifications of this example of the invention which fall in the scope of the appended claims.

I claim:

1. In an openable automobile roof structure in which a rigid panel is at least partially removable from a roof opening, thereby serving as an air vent and as a retractable sliding roof; the combination comprising:
    a generally rectangular roof opening in the horizontal portion of the roof structure;
    a downwardly recessed frame surrounding the roof opening on at least its front and side edges, as an integral part of the roof structure;
    a rigid panel whose outline matches that of the roof opening and which serves as a closure member for said opening when aligned with the edges thereof;
    a pivot connection between said rigid panel and the roof frame which permits said panel to be pivoted about a horizontal axis located near the front edge of said panel, the rear edge of the panel being thereby movable upwardly out of the roof opening;
    two rigid, generally flat shutter members arranged adjacent to the lateral edges of the rigid panel, so as to extend along at least a major portion of the panel length;
    means for movably connecting said shutter members to the rigid panel so that, when the rigid panel is in its open, upwardly pivoted position, the shutter members extend downwardly from its lateral edges, thereby substantially covering the gap between said panel and the lateral edges of the roof opening;
    said connecting means including a pivot connection between each said shutter member and the rigid panel, each pivot connection defining a horizontal pivot axis located near the forward extremity of the shutter members, the latter being thereby pivotable vertically relatively to said panel; and
    means spring-biasing the pivotable shutter members toward a downwardly extended position against stop means thereby precluding rattling.

2. A combination as claimed in claim 1, further comprising:
    means for abutting the pivotable shutter members in a downwardly extended position with respect to the rigid panel so as to limit their pivotability in that direction.

3. A combination as claimed in claim 2, wherein:
    the abutment means is in the form of stops arranged at the rigid panel, each stop including guide means for vertically guiding the rear portion of the associated shutter member.

4. A combination as claimed in claim 3,
    said rigid panel including two lateral, vertically oriented blinds fixedly attached to and depending from its respective longitudinal, side edges;
    said pivot connecting being between each said shutter member and one of said blinds near the forward extremity of the respective shutter member, each shutter member being arranged laterally inside each respective one of said blinds and pivotable vertically with respect thereto so as to be retractable behind said blinds.

5. A combination as claimed in claim 3,
    said spring-biasing means comprising a spring arranged between each shutter member and the rigid panel and urging the shutter member downwardly; and wherein the shutter members abut against the rain channel profiles in the closed position of the rigid panel, the contact pressure between the abutting parts, under the influence of said springs, being such that rattling of the shutter members against the rain channel profiles is prevented, when the automobile is subjected to vibrations.

6. In an openable automobile roof structure in which a rigid panel is at least partially removable from a roof opening, the combination comprising:
    a generally rectangular roof opening in the horizontal portion of the roof structure;
    a downwardly recessed frame surrounding the roof opening on at least its front and side edges, as an integral part of the roof structure;
    a rigid panel whose outline matches that of the roof opening and which serves as a closure member for said opening when aligned with the edges thereof;
    a pivot connection between said rigid panel and the roof frame which permits said panel to be pivoted about a horizontal axis located near the front edge of said panel, the rear edge of the panel being thereby movable upwardly out of the roof opening;
    two rigid, generally flat shutter members arranged adjacent to the lateral edges of the rigid panel, so as to extend along at least a major portion of the panel length;
    means for movably connecting said shutter members to the rigid panel so that, when the rigid panel is in its open, upwardly pivoted position, the shutter members extend downwardly from its lateral edges, thereby substantially covering the gap between said panel and the lateral edges of the roof opening;
    said connecting means including a pivot connection between each said shutter member and the rigid panel, the pivot connection defining a horizontal pivot axis located near the forward extremity of the shutter members, the latter being thereby pivotable vertically relatively to said panel;
    means for spring-biasing the pivotable shutter members toward a downwardly extended position,
    means for abutting the pivotable shutter members in a downwardly extended position with respect to the rigid panel so as to limit their pivotability in that direction,
    the abutment means is in the form of stops arranged at the rigid panel, each stop including guide means for vertically guiding the rear portion of the associated shutter member,
    said spring-biasing means comprising a spring arranged between each shutter member and the rigid panel and urging the shutter member downwardly; and wherein
    the shutter members abut against the rain channel profiles in the closed position of the rigid panel the contact pressure between the abutting parts, under the influence of said springs, being such that rattling of the shutter members against the rain channel profiles is prevented, when the automobile is subjected to vibrations.

7. In an openable automobile roof structure in which a rigid panel is at least partially removable from a roof opening, thereby serving as an air vent, the combination comprising:
- a roof opening in the horizontal portion of the roof structure;
- a downwardly recessed frame surrounding the roof opening on at least its front and side edges, as an integral part of the roof structure;
- a rigid panel whose outline matches that of the roof opening and which serves as a closure member for said opening when aligned with the edges thereof;
- a pivot connection between said rigid panel and the roof frame which permits said panel to be pivoted about a horizontal axis located near the front edge of said panel, the rear edge of the panel being thereby movable upwardly out of the roof opening;
- two rigid, generally flat shutter members arranged adjacent to the lateral edges of the rigid panel, so as to extend along at least a major portion of the panel length;
- means for movably connecting said shutter members to the rigid panel so that, when the rigid panel is in its open, upwardly pivoted position, the shutter members extend downwardly from its lateral edges, thereby substantially covering the gap between said panel and the lateral edges of the roof opening;
- said connecting means including a pivot connection between each said shutter member and the rigid panel, each pivot connection defining a horizontal pivot axis located near the forward extremity of the shutter members, the latter being thereby pivotable vertically relative to said panel; and
- means spring-biasing the pivotable shutter members toward a downwardly extended position against stop means thereby precluding rattling.

8. Moveable vehicle panel apparatus including a vehicle panel which is moveable to and from a closed position closing an opening in a vehicle body portion defining a passenger space, comprising:
- pivot means between said vehicle panel and said vehicle body portion for enabling said vehicle panel to be pivoted about an axis located near a front edge of said panel, a rear edge thereof thus being moveable inwardly into said opening and outwardly from said opening as said panel is moved to and from said closed position;
- a plurality of rigid, shutter members arranged adjacent to lateral edges of said vehicle panel, so as to extend along at least a major portion of the panel length;
- means for moveably connecting said shutter members to said vehicle panel so that, in an extended position, when the vehicle panel is in an open position, the shutter members extend from said lateral edges, thereby substantially covering gaps formed between said lateral edges of said vehicle panel and lateral edges of said opening;
- said connecting means including a pivotal connection between said shutter members and said vehicle panel, each pivotal connection defining a pivot axis located near the forward extremity of the shutter members, the latter being thereby pivotable relative to said vehicle panel; and
- resilient means for biasing the shutter members in a spring-like manner toward said extended position against stop means thereby precluding rattling.

9. Apparatus according to claim 8, further comprising said vehicle panel including two laterally oriented blinds fixedly attached to and depending from its respective longitudinal side edges;
- said pivotal connection being between each said shutter member and one of said blinds near the forward extremity of the respective shutter member, each shutter member being arranged laterally inside each respective one of said blinds and pivotable vertically with respect thereto so as to be retractable behind said blinds.

10. Apparatus according to claim 8, further comprising said resilient means comprising a spring arranged between each shutter member and the rigid panel and urging the shutter member toward said extended position and wherein the shutter members abut against rain channel profiles in the closed position of the vehicle panel the contact pressure between the abutting parts, under the influence of said springs, being such that rattling of the shutter members against the rain channel profiles is prevented, when the automobile is subjected to vibrations.

* * * * *